No. 671,696. Patented Apr. 9, 1901.
W. H. HAMMON.
PIPE COUPLING.
(Application filed Feb. 19, 1900. Renewed Dec. 28, 1900.)
(No Model.) 3 Sheets—Sheet 1.
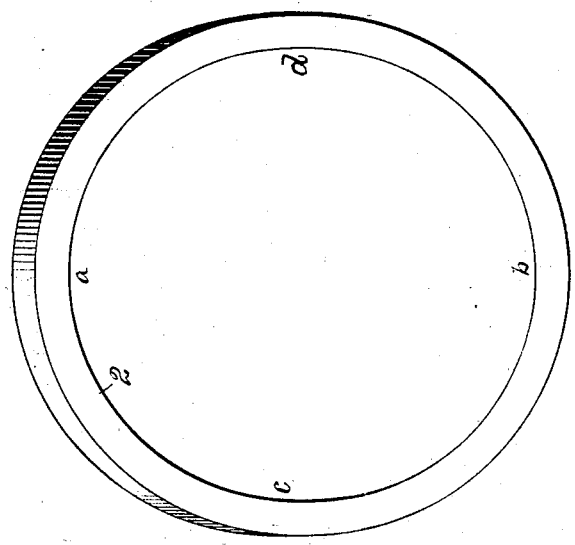
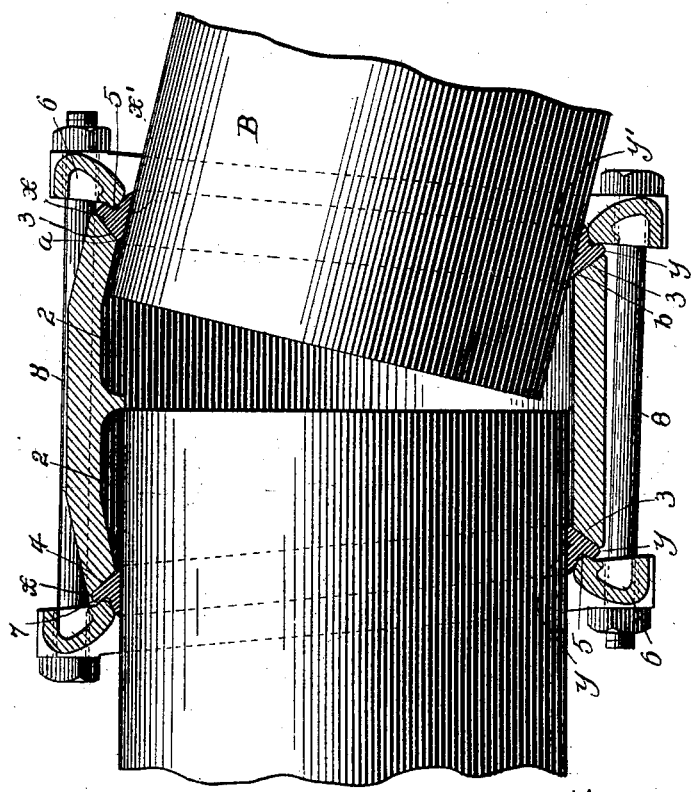
WITNESSES: INVENTOR
Herbert Bradley William H. Hammon
P. E. Gaither by Darwin S. Wolcott Att'y.

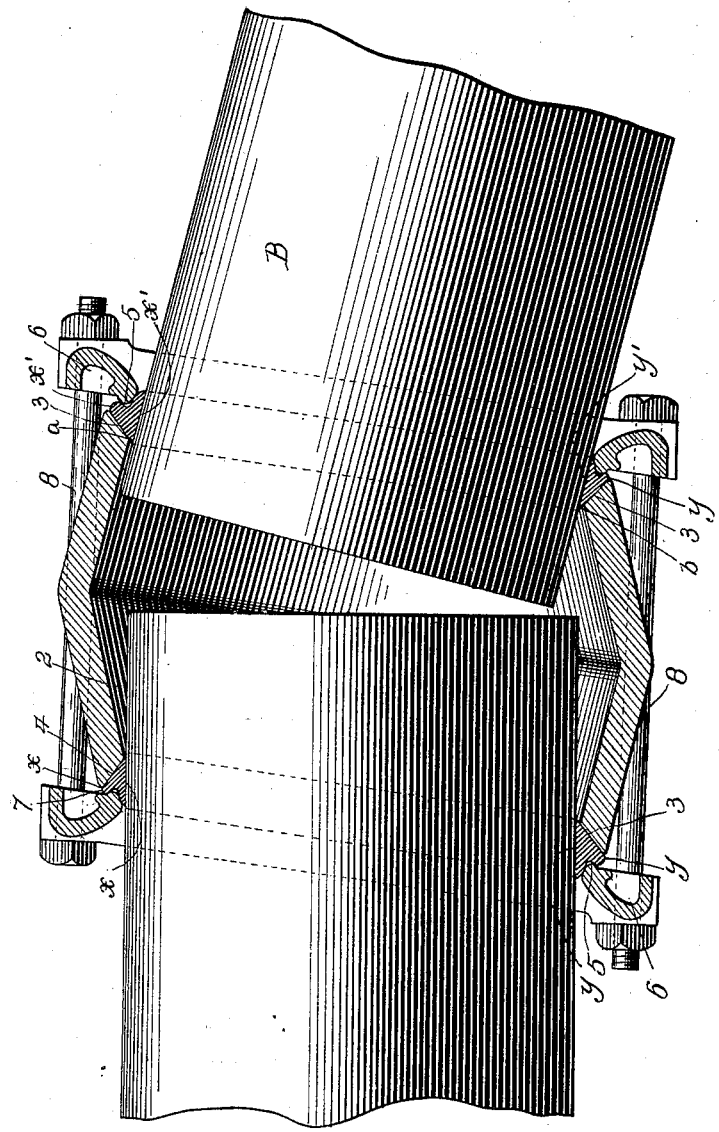

No. 671,696. Patented Apr. 9, 1901.
W. H. HAMMON.
PIPE COUPLING.
(Application filed Feb. 19, 1900. Renewed Dec. 28, 1900.)

(No Model.) 3 Sheets—Sheet 3.

WITNESSES:
Herbert Bradley
F. E. Gaither

INVENTOR,
William H. Hammon
by Dennis S. Wolcott
Att'y.

UNITED STATES PATENT OFFICE.

WILLIAM H. HAMMON, OF PITTSBURG, PENNSYLVANIA.

PIPE-COUPLING.

SPECIFICATION forming part of Letters Patent No. 671,696, dated April 9, 1901.

Application filed February 19, 1900. Renewed December 28, 1900. Serial No. 41,400. (No model.)

*To all whom it may concern:*

Be it known that I, WILLIAM H. HAMMON, a citizen of the United States, residing at Pittsburg, in the county of Allegheny and State of Pennsylvania, have invented or discovered certain new and useful Improvements in Pipe-Couplings, of which improvements the following is a specification.

The invention described herein relates to certain improvements in couplings for pipes, and has for one object a construction whereby the pipe-sections may be connected whether arranged with their axes in line or at an angle to each other.

It is a further object of the invention to so construct the coupling as to permit of its application to pipe-sections whose ends are not truly circular.

The invention is hereinafter more fully described and claimed.

Figure 5:
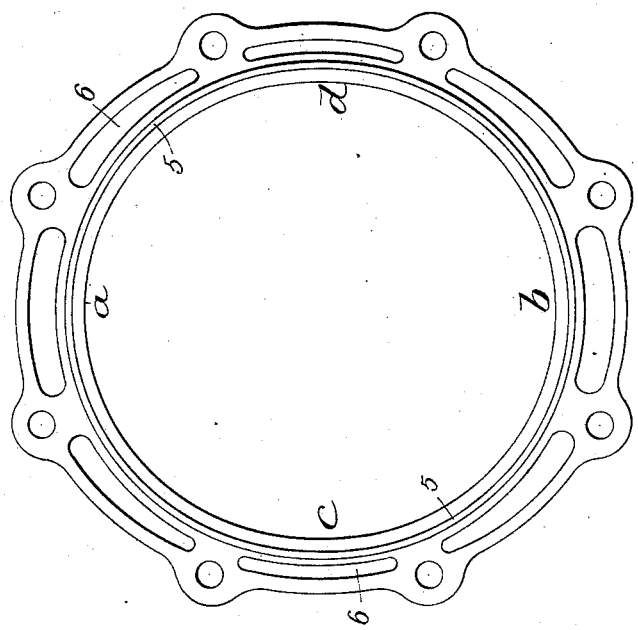
Figure 4:
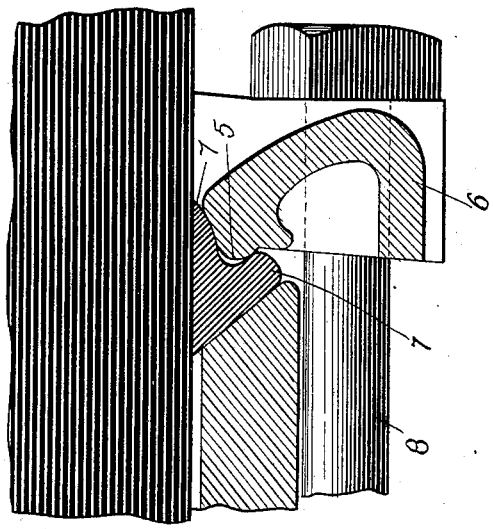

In the accompanying drawings, forming a part of this specification, Figure 1 is a sectional elevation of my improved coupler, one pipe-section being shown with its axis in line with the axis of the coupling-sleeve and the axis of the other section being at an angle to the axis of the sleeve. Fig. 2 is a view similar to Fig. 1, illustrating a modification in the shape or construction of the coupling-sleeve. Fig. 3 is an end elevation of the sleeve. Fig. 4 is a sectional detail view of a portion of the coupler, on an enlarged scale; and Fig. 5 is a front elevation of one of the follower-rings.

In the practice of my invention the coupling-sleeve is constructed so that the ends of the sleeve will lie in planes at angles other than right angles to the axis of the sleeve, as clearly shown in Fig. 1. The openings at the ends of the sleeve are made elliptical, the major diameter between the points $a\ b$ being greater than the minor diameter $c\ d$ and being at an angle to the axis of the sleeve, while the minor diameter is at right angles to the axis of the sleeve. By reason of this elliptical opening the end of a pipe-section which is not round can be entered into the sleeve and then the latter can be easily forced to its proper position. It will be understood that as the elliptical shape of the openings at the ends of the sleeve is due entirely to the fact that the sleeve itself is circular, that the edges of the openings lie in planes at an angle to the axis of the sleeve, and that all diameters in a plane at right angles to the axis of the sleeve are equal, hence when a pipe-section has been inserted into the sleeve the latter will bear equally at all points on the pipe.

As clearly shown in Figs. 1 and 2, the sleeve is enlarged internally to form pockets or recesses 2 for the reception of outer portions of the ends or "corners" of the pipe-sections when it is desired to connect two sections of pipe whose axes are at an angle to each other.

The sleeve may be made so that its ends will be in converging planes, as shown in Fig. 1, or in parallel or substantially parallel planes, as shown in Fig. 2.

The end walls of the sleeve are beveled or inclined, as at 3, so as to form seats or bearings for the packing-rings. As these inclined faces are formed with reference to the plane in which the ends of the sleeve lie and as these planes are at angles to the axis of the sleeve, it follows that when a pipe-section is placed in the sleeve with its axis in line with the axis of the sleeve the pocket formed by the inclined face 3 and the wall of the pipe will be wider on one side than at any other point—that is to say, the distance between the points $x\ x$ is less than the distance between the points $y\ y$, as shown on the left in Figs. 1 and 2. On the other hand, when the axis of the pipe-section forms the greatest angle with the axis of the sleeve, as shown at the right in Figs. 1 and 2, the distance between the points $x'\ x'$ will be greater than the distance between the points $y'\ y'$.

In order to efficiently fill the packing-ring pockets, which, as stated, vary in transverse dimensions, the packing-rings 4 are made thicker in the direction of their diameters on one side than on the other, as shown in Figs. 1 and 2, so that by merely changing their positions around the pipe they will completely fill all portions of the pockets when the pipe-sections are in extreme positions and will also be efficient, although, perhaps, to a slightly less degree in other positions of the pipe-sections.

It is preferred to form the packing-ring approximately wedge-shaped in cross-section, its inner wall being straight, so as to lie flat on the pipe-section, while the outer face has approximately the same inclination as the face 2 of the sleeve. The rear face of the packing-ring is recessed for the reception of the expanding-rib 5 on the follower-ring 6. It is preferred that the rib 5 should be approximately cone-shaped in cross-section, so that it will enter and force apart the lips 7, formed by recessing the rear face of the packing-ring.

In order that the follower-ring may be drawn up against the packing-ring by the bolts 8, it is made elliptical, corresponding with the elliptical openings at the ends of the sleeve, as shown in Fig. 5.

It will be readily understood by those skilled in the art that by merely turning the sleeve around the pipe-section B may be inclined in any other direction than that shown in Fig. 1 and also by increasing the length of the longest part of the sleeve or by shortening the short portion thereof and at the same time increasing the depth of the pockets 2 the pipe-sections may be arranged at a greater angle to the axis of the sleeve than that indicated in Figs. 1 and 2.

I claim herein as my invention—

1. A sleeve for coupling pipes, having elliptical openings in its ends, the major diameters of said openings being at angles other than right angles to the axis of the sleeve, substantially as set forth.

2. A sleeve for coupling pipes, having elliptical openings in its ends, the major diameters of said openings being at angles other than right angles to the axis of the sleeve, said sleeve being internally recessed or enlarged, substantially as set forth.

3. A sleeve for coupling pipes, formed with its ends in planes at angles other than right angles to the axis of the sleeve, the openings in said ends being elliptical, and the major diameters of said openings being at angles to the axis of the sleeve, substantially as set forth.

4. In a pipe-coupling, the combination of a sleeve having elliptical openings in its ends, the major diameters of said openings being at angles other than right angles to the axis of the sleeve, a packing-ring and a follower-ring having an elliptical or oval internal contour, substantially as set forth.

5. In a pipe-coupling, the combination of a sleeve having elliptical openings in its ends, the major diameters of said openings being at an angle other than a right angle to the axis of the sleeve, a packing-ring diametrically thicker on one side than on the other and a follower-ring having an elliptical or oval internal contour, substantially as set forth.

6. In a pipe-coupling, the combination of a sleeve having its ends lying in converging planes, a packing-ring and a follower-ring having an elliptical or oval internal contour, substantially as set forth.

7. In a pipe-coupling, the combination of a sleeve having its ends lying in converging planes, a packing diametrically thicker on one side than the other, and a follower-ring having an elliptical or oval internal contour, substantially as set forth.

In testimony whereof I have hereunto set my hand.

WILLIAM H. HAMMON.

Witnesses:
DARWIN S. WOLCOTT,
G. I. HOLDSHIP.